United States Patent
Toya et al.

(10) Patent No.: US 8,305,036 B2
(45) Date of Patent: Nov. 6, 2012

(54) BATTERY CHARGER CRADLE

(75) Inventors: Shoichi Toya, Hyogo (JP); Yasunari Mizoguchi, Hyogo (JP); Eiji Satsuma, Hyogo (JP); Kyozo Terao, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 879 days.

(21) Appl. No.: 12/314,743

(22) Filed: Dec. 16, 2008

(65) Prior Publication Data

US 2009/0153098 A1   Jun. 18, 2009

(30) Foreign Application Priority Data

Dec. 18, 2007 (JP) ................................ 2007-325662
Mar. 13, 2008 (JP) .................................. 2008-64860
Nov. 17, 2008 (JP) ................................ 2008-293933

(51) Int. Cl.
*H02J 7/00* (2006.01)
(52) U.S. Cl. ........ 320/108; 320/107; 320/109; 320/114; 320/132
(58) Field of Classification Search .................. 320/108
See application file for complete search history.

(56) References Cited

U.S. PATENT DOCUMENTS

| 5,821,731 | A * | 10/1998 | Kuki et al. ................. 320/108 |
| 7,772,802 | B2 * | 8/2010 | Manico et al. ............... 320/108 |
| 2004/0008514 | A1 * | 1/2004 | Lee et al. ..................... 362/259 |
| 2009/0096413 | A1 * | 4/2009 | Partovi et al. ................ 320/108 |
| 2009/0153098 | A1 | 6/2009 | Toya |
| 2010/0270970 | A1 | 10/2010 | Toya et al. |
| 2010/0315038 | A1 | 12/2010 | Terao et al. |

FOREIGN PATENT DOCUMENTS

| JP | 3011829 | 6/1995 |
| JP | 9-63655 | 3/1997 |

* cited by examiner

*Primary Examiner* — Edward Tso
*Assistant Examiner* — Ahmed Omar
(74) *Attorney, Agent, or Firm* — Wenderoth, Lind & Ponack, LLP

(57) ABSTRACT

In a battery charger cradle, a battery incorporated in a battery built-in device is charged by electric power induced to an induction coil. The cradle includes a primary coil for inducing electromotive force to the induction coil, a casing having a top plate atop of which the battery built-in device is placed, a movement mechanism for moving the primary coil along an inner surface of the top plate, and a position detection controller for detecting a position of the battery built-in device placed on the top plate and controlling the movement mechanism to bring the primary coil closer to the induction coil in the battery built-in device. When the battery built-in device is placed on the top plate, the position detection controller detects the position of the battery built-in device, and the movement mechanism moves the primary coil closer to the induction coil in the battery built-in device.

22 Claims, 11 Drawing Sheets

BATTERY CHARGER CRADLE

BACKGROUND OF THE INVENTION

1. Field of the Invention

The present invention relates to a battery charger cradle, on which battery built-in devices such as a battery pack and a mobile phone can be placed, to recharge a built-in battery when electric power is carried by the effect of electromagnetic induction.

2. Description of the Related Art

A battery charger cradle has been developed for recharging a built-in battery, where electric power is carried from a primary coil to an induction coil (a secondary coil) by the effect of electromagnetic induction. Refer to Japanese Patent Laid-Open Publication No. H09-63655 (1997) and Japanese Utility Model Registration No. 3011829.

Described in Japanese Patent Laid-Open Publication No. H09-63655 (1997) is a structure in which the primary coil excited by an AC power source is incorporated in the battery charger cradle and the induction coil electromagnetically coupled to the primary coil is incorporated in a battery pack. The battery pack also incorporates a circuit in which an alternating current induced to the induction coil is rectified and supplied to the rechargeable battery for a charging operation. In accordance with such structure, the battery pack is placed on the battery charger cradle so that the battery contained in the battery pack can be recharged in a non-contact state.

Japanese Utility Model Registration No. 3011829 describes a structure in which the battery is contained in the bottom of the battery built-in device and a secondary-side charging adaptor is provided subjacently to the battery so that the induction coil and charging circuit are incorporated in the secondary-side charging adaptor. Also described is a structure in which the primary coil electromagnetically coupled to the induction coil is provided in the battery charger cradle. The battery built-in device coupled to the secondary-side charging adaptor is placed on the battery charger cradle, and the electric power is carried from the primary coil to the induction coil to recharge the battery contained in the battery built-in device.

SUMMARY OF THE INVENTION

Japanese Patent Laid-Open Publication No. H09-63655 (1997) presents a drawback that, when the battery pack on the battery charger cradle is out of alignment, the battery pack cannot be charged. This is because, when a relative position between the mobile electronic device and the battery charger cradle is out of alignment, the primary coil and the induction coil are not electromagnetically coupled to each other; and such state disables AC electric power to be carried from the primary coil to the induction coil. Such drawback can be remedied, as described in Japanese Utility Model Registration No. 3011829, when a positioning protrusion is provided on the battery charger cradle and also a positioning recess is provided in the mobile electronic device, with the positioning protrusion being fitted in the positioning recess. In such structure, the positioning protrusion is guided into the positioning recess, enabling a relative misalignment to be avoided between the mobile electronic device and the battery charger cradle.

The structure disclosed in Japanese Utility Model Registration No. 3011829, however, presents a drawback in that it is time-consuming and cumbersome to set the battery built-in device in place because the battery built-in device is placed on the battery charger cradle such that the positioning protrusion is guided into the positioning recess. Another drawback presented in this structure is that it is difficult for all users to always set the battery built-in device on the battery charger cradle in a normal manner. Even another drawback presented in such structure is that the battery built-in device cannot be made thin enough because the positioning recess is provided in the casing bottom and the induction coil is disposed superjacent to the positioning recess. Since a battery built-in device such as a mobile phone is required to be made as thin as possible, an increased thickness caused by the positioning recess presents a drawback that convenient portability is spoiled.

The above-mentioned drawbacks can be overcome when a magnetic field for carrying the electric power to the induction coil is generated over a large area of the entire top surface of the battery charger cradle. This structure, however, also presents a drawback in that efficiency decreases in the electricity to be carried from the primary coil to the induction coil because the magnetic field is also generated in portions where the battery built-in device is not placed. The structure also suffers the disadvantage that, when a metallic element such as iron is placed atop of the battery built-in device, heat is likely to be generated when an electric current flows to the metallic element by the effect of electromagnetic induction.

The present invention has been made to overcome the above-mentioned drawbacks. It is the primary object to provide a battery charger cradle on which a built-in battery can be efficiently recharged wherever a battery built-in device is placed atop of the casing.

Further, another important object of the present invention is to provide a battery charger cradle in which the electric power can be efficiently carried from the primary coil to the induction coil, assuring safety in use because, even when another metallic element is placed atop of the casing together with the battery built-in device, heat is not generated by an electric current flowing to the metallic element by the effect of electromagnetic induction.

In order to achieve the above-described objects, the battery charger cradle of the present invention is provided with the following composition.

The battery charger cradle is designed to be used with a battery built-in device 50, 90 incorporating an electromagnetically coupled induction coil 51 and also incorporating a battery that is recharged by electric power induced to the induction coil 51. The battery charger cradle includes a primary coil 11 connected to an AC power source 12, 82 for inducing electromotive force to the induction coil 51, a casing 20 containing the primary coil 11 and having a top plate 21 on the top of which the battery built-in device 50, 90 is to be placed, a movement mechanism 13 contained in the casing 20 for moving the primary coil 11 along the inner surface of the top plate 21, and a position detection controller 14, 64 detecting a position of the battery built-in device 50, 90 placed on the top plate 21 and controlling the movement mechanism 13 to bring the primary coil 11 closer to the induction coil 51 contained in the battery built-in device 50, 90. In the battery charger cradle, when the battery built-in device 50, 90 is placed on the top plate 21 of the casing 20, the position detection controller 14, 64 detects the position of the battery built-in device 50, 90, the position detection controller 14, 64 controls the movement mechanism 13, and the movement mechanism 13 moves the primary coil 11 along the top plate 21 to bring the primary coil 11 closer to the induction coil 51 contained in the battery built-in device 50, 90.

The above described battery charger cradle carries the advantage that the built-in battery can be efficiently charged wherever the battery built-in device is placed on the top surface of the casing. This is because, while the above described battery charger cradle incorporates, in the casing having the top plate, the primary coil for inducing electromotive force to the induction coil contained in the battery built-in device, the battery charger cradle is provided with the movement mechanism for moving the primary coil along the inner surface of the top plate and is also provided with the position detection controller detecting the position of the battery built-in device to be placed on the top plate and controlling the movement mechanism to bring the primary coil closer to the induction coil contained in the battery built-in device; and further, when the battery built-in device is placed on the top plate of the casing, the position of the battery built-in device is detected by the position detection controller, and the position detection controller controls the movement mechanism to bring the primary coil closer to the induction coil contained in the battery built-in device. In the battery charger cradle of this structure, since the position detection controller detects the position of the battery built-in device to be placed on the top surface of the casing and controls the movement mechanism to bring the primary coil closer to the induction coil contained in the battery built-in device, and so wherever the battery built-in device is placed on the top surface of the casing, the battery incorporated in the battery built-in device can be efficiently charged when the primary coil is brought closer to the induction coil and the electric power is efficiently carried from the primary coil to the induction coil.

Particularly, in the above-described battery charger cradle, the built-in battery can be efficiently charged by very easily placing the battery built-in device on the battery charger cradle, unlike in a conventional case where the battery built-in device has to be placed at a prescribed spot of the battery charger cradle, for example, by guiding the positioning protrusion to be fitted into the positioning recess, that is, by determining a position for connection. As can be seen from the above description, the battery charger cradle where such positioning protrusion, positioning recess and the like are not required also carries the advantage that the battery built-in device can be designed to be thin enough for convenient mobility.

Further, the above-described battery charger cradle carries the advantage that, because the position detection controller detects the position of the battery built-in device placed on the top plate of the casing and the primary coil is brought closer to the induction coil to charge the battery contained in the battery built-in device, even when other metallic element is placed together with the battery built-in device on the top surface of the casing, safe use of the battery charger cradle can be assured by securely inhibiting a current flow which might be caused by (the effect of) the electromagnetic induction to such metallic element.

Further, the above-described battery charger cradle carries the advantage that the top plate of the casing is so sized as to allow a plurality of battery built-in devices to be placed on, and when the full charge detection circuit in the position detection controller detects a full charge state of a battery contained in the battery built-in device being subjected to a charging operation, a position of a non-charged battery built-in device incorporating a battery which is not fully charged is detected, the movement mechanism is controlled to bring the primary coil closer to the induction coil contained in the battery built-in device to charge the battery contained in the non-charged battery built-in device, and thus when the plurality of battery built-in devices are placed on the top plate, the batteries contained in the battery built-in devices can be switched one after another to be fully charged.

Further, in the above-described battery charger cradle, since the position detection controller detects the position of the induction coil and brings the primary coil closer to the induction coil, an efficient charging operation can be effected by bringing the primary coil precisely closer to the induction coil. Particularly, in this battery charger cradle, since the position of the induction coil contained in the battery built-in device is detected by the position detection controller and the primary coil is brought closer to the induction coil, the built-in battery can be efficiently charged by detecting the position of the induction coil contained in the battery built-in device by means of the position detecting controller in a state of placing various battery built-in devices on the top plate of the battery charger cradle, regardless of a structure or model of the battery built-in device, in other words, regardless of the position of the induction coil contained in the battery built-in device.

Further, in the above-described battery charger cradle, since the position detection controller moves the primary coil along the top plate in the directions of X axis and Y axis to be brought closer to the induction coil, the primary coil can be quickly brought closer to the induction coil, with a simplified structure of the movement mechanism.

Further, in the structure of the above-described battery charger cradle, since the position detection controller includes a plurality of position detection coils fixed to the top plate, a pulsed power source for supplying a pulse signal to the position detection coil, a receiver circuit 32 for receiving an echo signal outputted to the position detection coil from the induction coil which is excited by the pulse signal supplied from the pulsed power source to the position detection coil, and a discrimination decision circuit for judging a position of the induction coil on the basis of the echo signal received by the receiver circuit, a precise position of the induction coil can be electrically checked on the basis of the echo signal outputted from the induction coil, namely, by an electrical signal.

Further, the structure of the above-described battery charger cradle carries the advantage that, since the AC power source has a self-excited oscillation circuit, and the position detection controller detects the position of the induction coil on the basis of an oscillating frequency of the self-excited oscillation circuit to control the movement mechanism, a position of the induction coil can be precisely detected.

Further, the structure of the above-described battery charger cradle carries the advantage that, since the position detection controller is composed of a first position detection controller for roughly detecting a position of the induction coil contained in the battery built-in device and a second position detection controller for precisely detecting the position of the induction coil, the primary coil having been brought closer to the induction coil by the first position detection controller is then brought even closer to the induction coil by the second position detection controller, and thus the induction coil can be positioned more precisely.

Particularly, in the structure of the above-described battery charger cradle, since the first position detection controller transmits the pulse signal to the plurality of position detection coils fixed to the top plate and the receiver circuit receives the echo signal outputted to the position detection coil from the induction coil which is excited by the pulse signal to judge the position of the induction coil, the position of the induction coil can be electrically checked by means of the plurality of position detection coils over a wide area for detection. This structure, enabling a wide area to be efficiently detected, is very effective as the first position detection controller for roughly detecting the position of the induction coil contained in the battery built-in device.

Furthermore, in the above-described battery charger cradle, since the second position detection controller precisely detects the position of the induction coil on the basis of the oscillating frequency of the self-excited oscillation circuit possessed by the AC power source, the structure is effective enough as the second position detection controller for precisely detecting the position of the induction coil.

Further, in the above-described battery charger cradle, the position detection controller includes a plurality of position detection coils fixed to the top plate, a pulsed power source for supplying a pulse signal to the position detection coil(s), a receiver circuit for receiving the echo signal outputted to the position detection coil from the induction coil which is excited by the pulse signal supplied from the pulsed power source to the position detection coil, and a discrimination decision circuit for judging a position of the primary coil on the basis of the echo signal received by the receiver circuit; since the discrimination decision circuit detects the position of the induction coil by comparing the level of the echo signal induced to each of the position detection coils with the level of the echo signal stored in the memory circuit in the discrimination decision circuit, the position of the induction coil can be precisely detected on the basis of the level of echo signal induced to the position detection coil. In this battery charger cradle, when the position of the induction coil is precisely detected by the position detection controller, the built-in battery can be efficiently charged by quickly bringing the primary coil closer to the induction coil.

In the above-described battery charger cradle, the second position detection controller 14C can be arranged to move the primary coil 11 and stop the primary coil 11 at a position where a voltage of the primary coil 11 becomes the lowest. Further, in the above-described battery charger cradle, the second position detection controller 14C can also be arranged to move the primary coil 11 and stop the primary coil 11 at a position where power consumption of an AC power source 82 becomes the smallest. Furthermore, in the above-described battery charger cradle, the second position detection controller 14C can also be arranged to move the primary coil 11 and stop the primary coil 11 at a position where an electric current flowing through the induction coil 51 becomes the largest.

The above and further objects of the present invention as well as the features thereof will become more apparent from the following detailed description to be made in conjunction with the accompanying drawings.

DESCRIPTION OF THE PREFERRED EMBODIMENT(S)

Figure 1:
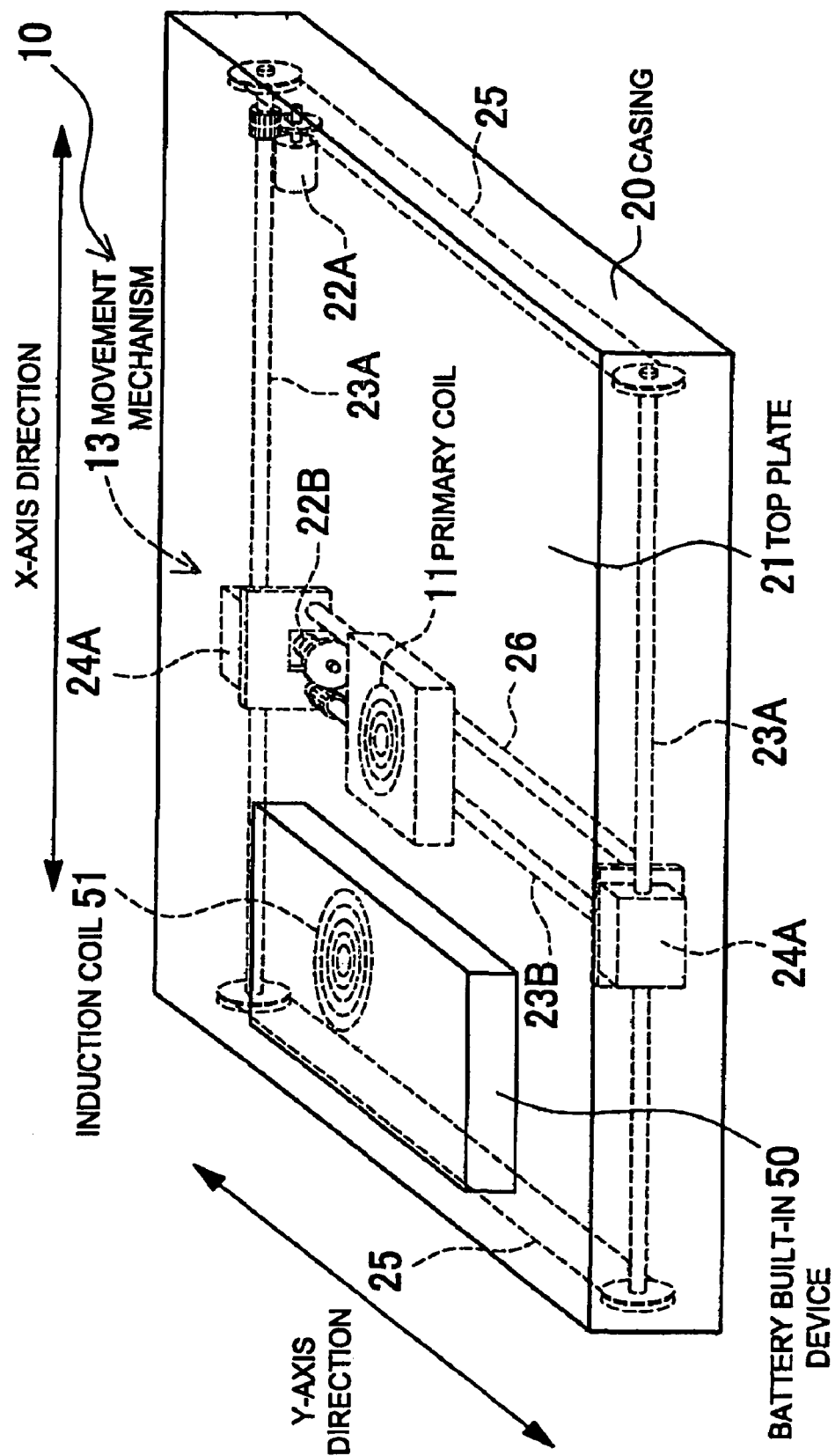
FIG. 1 is a schematic perspective view of the battery charger cradle in accordance with an embodiment of the present invention.
Figure 2:
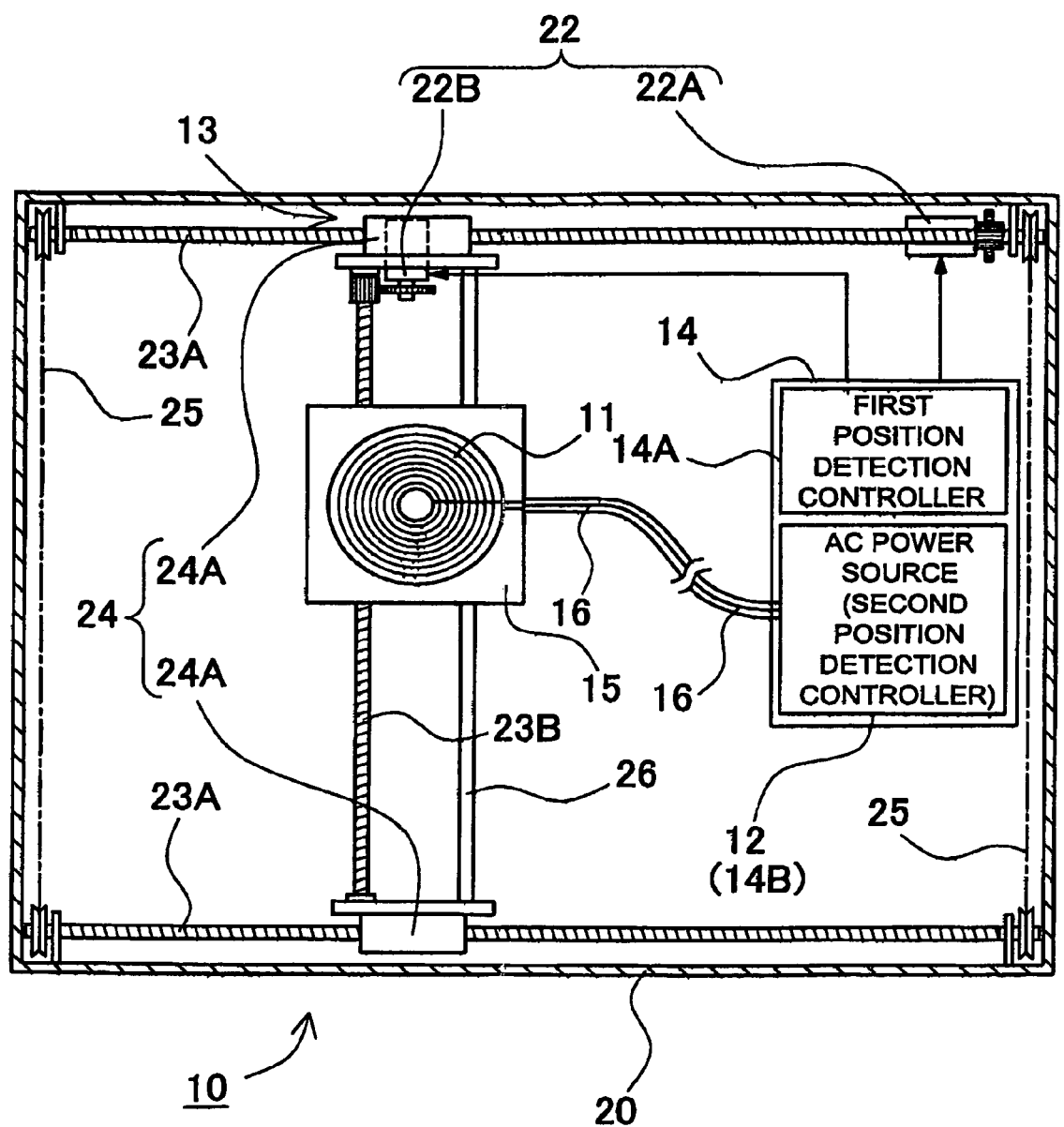
FIG. 2 is a block schematic diagram of the battery charger cradle in accordance with an embodiment of the present invention.
Figure 3:
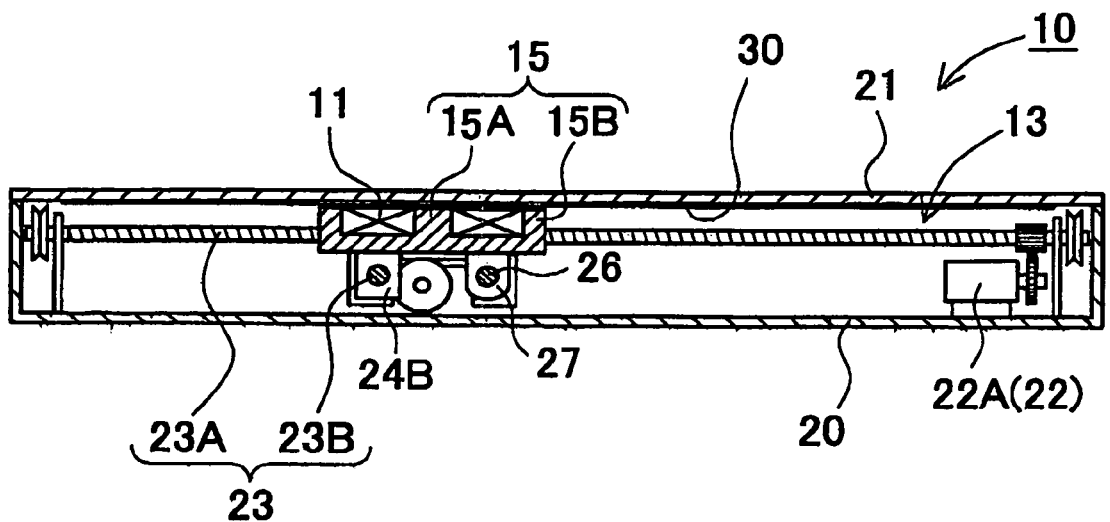
FIG. 3 is a vertical cross-sectional view, as viewed orthogonally to X axis, of the battery charger cradle shown in FIG. 2.
Figure 4:
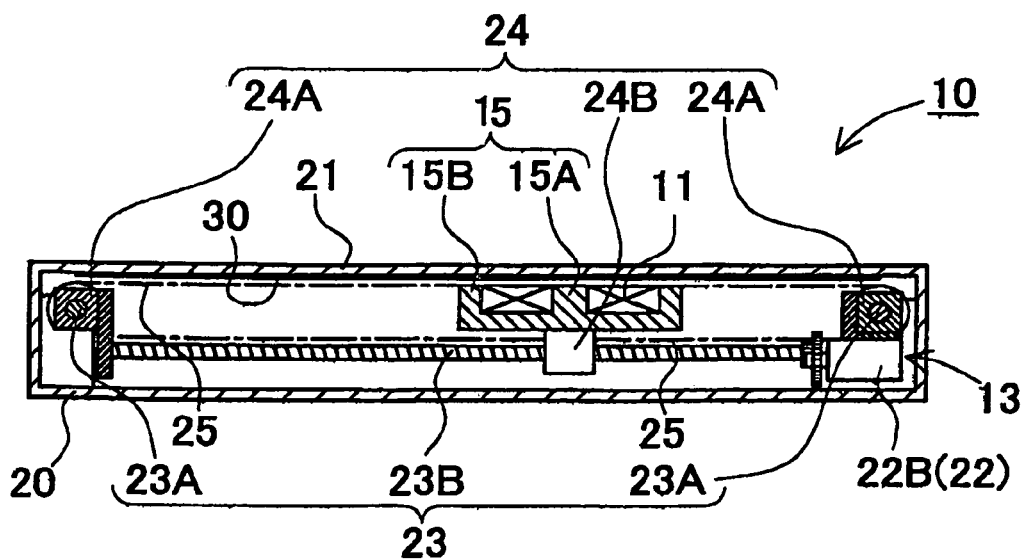
FIG. 4 is a vertical cross-sectional view, as viewed orthogonally to Y axis, of the battery charger cradle shown in FIG. 2.
Figure 5:
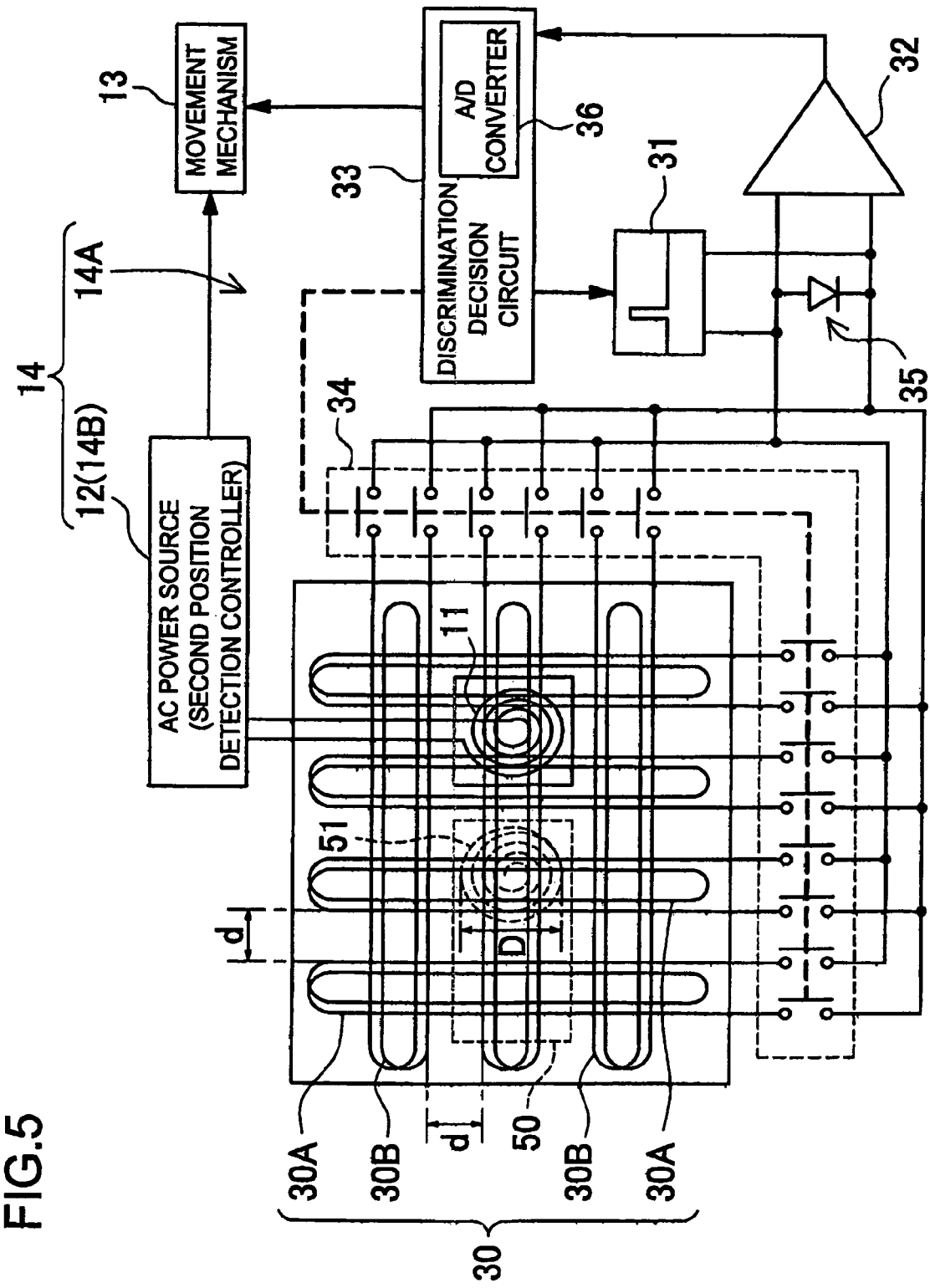
FIG. 5 is a circuit diagram showing the position detection controller contained in the battery charger cradle in accordance with an embodiment of the present invention.
Figure 6:
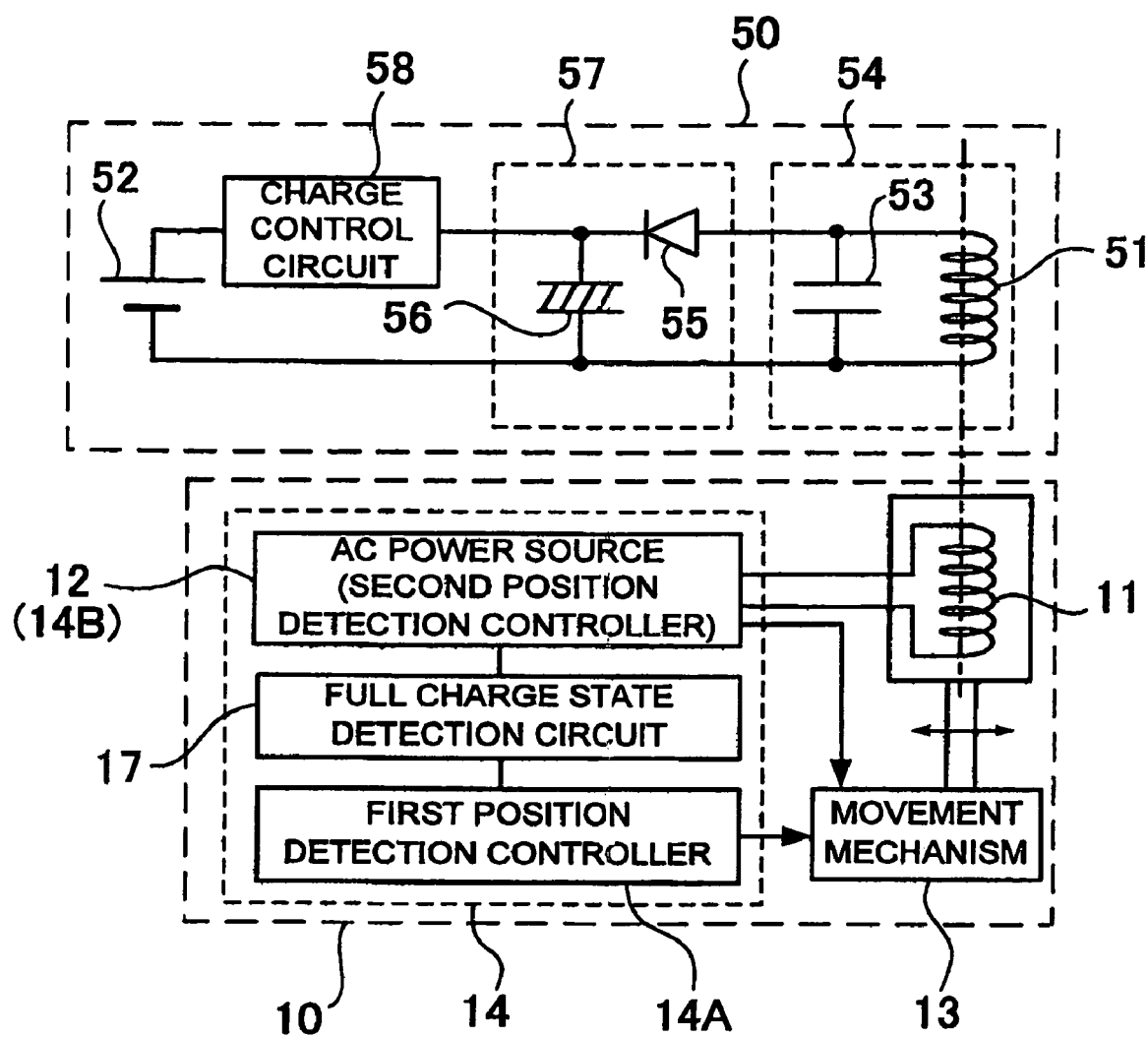
FIG. 6 is a block diagram showing the battery charger cradle and the battery built-in device in accordance with an embodiment of the present invention.

FIG. 1 through FIG. 6 show block schematic diagrams and principle diagrams of a battery charger cradle. As shown in FIG. 1 and FIG. 6, the battery charger cradle 10 is so designed as to place a battery built-in device 50 atop of the battery charger cradle 10 and charge a built-in battery 52 contained in a battery built-in device 50 by the effect of electromagnetic induction. The battery built-in device 50 incorporates an induction coil 51 electromagnetically coupled to a primary coil 11. The battery built-in device 50 contains a battery 52 that is charged by electric power induced to the induction coil 51. Instead, the battery built-in device 50 may be a battery pack.

FIG. 6 shows a circuit diagram of the battery built-in device 50. The battery built-in device 50 has a capacitor 53 being parallel-connected to the induction coil 51. The capacitor 53 and the induction coil 51 constitute a parallel resonance circuit 54. A resonance frequency of the capacitor 53 and the induction coil 51, as a frequency similar to a frequency electrically carried from the primary coil 11, can be electrically carried from the primary coil 11 to the induction coil 51 in an efficient manner. The battery built-in device 50 shown in FIG. 6 includes a rectifier circuit 57 composed of a diode 55 for rectifying an alternating current outputted from the induction coil 51 and a smoothing capacitor 56 for smoothing a pulsating flow having been rectified, and a charge control circuit 58 for charging a battery 52 by using a direct current outputted from the rectifier circuit 57. The charge control circuit 58 stops a charging operation when detecting a full charge state of the battery 52.

As shown in FIG. 1 through FIG. 6, the battery charger cradle 10 includes a primary coil 11 connected to an AC power source 12 for inducing electromotive force to the induction coil 51, a casing 20 containing the primary coil 11 and having a top plate 21 on the top of which the battery built-in device 50 is placed, a movement mechanism 13 contained inside the casing 20 for moving the primary coil 11 along the inner surface of the top plate 21, and a position detection controller 14 for detecting a position of the battery built-in device 50 placed on the top plate 21 and controlling the movement mechanism 13 to bring the primary coil 11 closer to the induction coil 51 contained in the battery built-in device 50. The battery charger cradle 10 contains, in the casing 20, the AC power source 12, the movement mechanism 13 and the position detection controller 14.

The battery charger cradle 10 is so designed as to charge the built-in battery 52 contained in the battery built-in device 50 in the following operations.

(1) When the battery built-in device 50 is placed on the top plate 21 of the casing 20, a position of the battery built-in device 50 is detected by the position detection controller 14.

(2) The position detection controller 14 having detected the position of the battery built-in device 50 controls the movement mechanism 13, moves the primary coil 11 along the top plate 21 by means of the movement mechanism 13, and brings the primary coil 11 closer to the induction coil 51 contained in the battery built-in device 50.

(3) The primary coil 11 brought closer to the induction coil 51 is electromagnetically coupled to the induction coil 51 to carry AC power to the induction coil 51.

(4) The battery built-in device 50 rectifies the AC power at the induction coil 51 to be converted into a direct current, and thus the built-in battery 52 is charged by the direct current.

The battery charger cradle 10 charging the battery 52 contained in the battery built-in device 50 in accordance with the above-described operations contains inside the casing 20 the primary coil 11 connected to the AC power source 12. The primary coil 11, being disposed beneath the top plate 21 of the casing 20, is arranged so as to move along the top plate 21. Efficiency of carrying the electric power from the primary coil 11 to the induction coil 51 can be improved by narrowing a distance between the primary coil 11 and the induction coil 51. Preferably, in a state of bringing the primary coil 11 closer to the induction coil 51, the distance between the primary coil 11 and the induction coil 51 is set to be smaller than or equal to 7 mm. Thus, the primary coil 11, being beneath the top plate 21, is disposed as close to the top plate 21 as possible. Since the primary coil 11 moves so as to be brought closer to the induction coil 51 contained in the battery built-in device 50 placed on the top plate 21, the primary coil 11 is arranged so as to be moveable along the lower surface of the top plate 21.

The casing 20 containing the primary coil 11 is provided with the planar top plate 21 on the top of which the battery built-in device 50 is placed. In regard to the illustrated battery charger cradle 10, the top plate 21 being planar in its entirety is disposed horizontally. The top plate 21 is so sized as to allow a variety of battery built-in devices 50 with different sizes and contours to be placed thereon, for example, the top plate 21 being of a square shape with one side being 5-30 cm or of a circular shape with a diameter of 5-30 cm. In the battery charger cradle of the present invention, the top plate may also be made larger, namely large enough to allow a plurality of battery built-in devices to be simultaneously placed on, in order that the built-in batteries contained in the plurality of battery built-in devices thus simultaneously placed may be charged one after another. Further, the top plate may be provided with peripheral walls or the like in the circumference, and the battery built-in device may be placed inside the peripheral walls to charge the built-in battery.

The primary coil 11 is spirally wound on a plane parallel to the top plate 21 and emits an AC magnetic flux toward the top plate 21. The primary coil 11 emits the AC magnetic flux being orthogonal to the top plate 21 toward the top plate 21. When the AC power is supplied from the AC power source 12, the primary coil 11 emits the AC magnetic flux toward the top plate 21. The primary coil 11 can be arranged so as to have larger inductance by winding a wire rod on a core 15 made of a magnetic material. The core 15, made of a magnetic material such as ferrite having larger magnetic permeability, is of a barrel shape with its top being open. The barrel-shaped core 15 is of a shape in which a columnar portion 15A disposed in the center of the spirally wound primary coil 11 is connected, at the bottom portion, to the tubular portion 15B disposed externally. The primary coil 11 with the core 15 can focus the magnetic flux to a specific portion to efficiently carry the electric power to the induction coil 51. However, the primary coil does not necessarily have to be provided with such core, and may be an air-core coil, instead. Since the air-core coil is lighter in weight, the movement mechanism for moving the air-core coil along the inner surface of the top plate can be simplified (in structure). The primary coil 11, with its diameter being made generally equal to the outer diameter of the induction coil 51, carries the electric power efficiently to the induction coil 51.

The AC power source 12 supplies high-frequency power ranging, for example, from 20 kHz to 1 MHz to the primary coil 11. The AC power source 12 is connected via a flexible lead wire 16 to the primary coil 11. This is because the primary coil 11 is moved in order to be brought closer to the induction coil 51 contained in the battery built-in device 50 placed on the top plate 21. Although not shown, the AC power source 12 includes a self-excited oscillation circuit and a power amplifier for electrically amplifying the alternating current outputted from the oscillation circuit. In the self-excited oscillation circuit, the primary coil 11 is used as an oscillation coil. Therefore, in this oscillation circuit, an oscillating frequency is varied in accordance with the inductance of the primary coil 11. The inductance at the primary coil 11 is varied in accordance with a relative position between the primary coil 11 and the induction coil 51. This is because mutual inductance with respect to the primary coil 11 and the induction coil 51 is varied in accordance with the relative position between the primary coil 11 and the induction coil 51. Therefore, the self-excited oscillation circuit using the primary coil 11 as the oscillation coil is varied as the AC power source 12 is brought closer to the induction coil 51. For such reason, the self-excited oscillation circuit can detect the relative position between the primary coil 11 and the induction coil 51 in accordance with the variation in the oscillating frequency, and the oscillation circuit can be used as the position detection controller 14 as well.

The primary coil 11 is moved by the movement mechanism 13 to be brought closer to the induction coil 51. The movement mechanism 13 shown in FIG. 1 through FIG. 4 moves the primary coil 11 along the top plate 21 in the directions of the X axis and the Y axis to bring the primary coil 11 closer to the induction coil 51. In the illustrated movement mechanism 13, the primary coil 11 is brought closer to the induction coil 51 by rotating a threaded rod 23 by using a servomotor 22 and by moving a nut element 24 screwed on the threaded rod 23. The servomotor 22 includes an X-axis servomotor 22A for moving the primary coil 11 in the direction of the X axis and a Y-axis servomotor 22B for moving the primary coil 11 in the direction of the Y axis. The threaded rod 23 includes a pair of X-axial threaded rods 23A for moving the primary coil 11 in the direction of the X axis and a Y-axial threaded rod 23B for moving the primary coil 11 in the direction of the Y axis. The pair of X-axial threaded rods 23A are disposed in a mutually parallel relationship, driven by means of a belt 25, and rotated together by means of the X-axis servomotor 22A. The nut element 24 includes a pair of X-axis nut elements 24A threaded on each of the X-axial threaded rods 23A and a Y-axis nut element 24B threaded on the Y-axial threaded rod 23B. The Y-axial threaded rod 23B has its opposite ends rotatably connected to the pair of X-axis nut elements 24A. The primary coil 11 is connected to the Y-axis nut element 24B.

Further, in order to move the primary coil 11 in the direction of the Y axis in a horizontal posture, the illustrated movement mechanism 13 has a guide rod 26 disposed in parallel with the Y-axial threaded rod 23B. The guide rod 26 has its opposite ends connected to the pair of X-axis nut elements 24A, and moves together with the pair of X-axis nut elements 24A. The guide rod 26 extends through a guide portion 27 connected to the primary coil 11 so as to enable the primary coil 11 to move along the guide rod 26 in the direction of the Y axis. That is to say, the primary coil 11 moves in the direction of Y axis in a horizontal posture, via the Y-axis nut element 24B and guide portion 27 which move along the Y-axial threaded rod 23B and the guide rod 26 which are disposed in a mutually parallel relationship.

The movement mechanism 13 is so constructed and arranged that, when the X-axis servomotor 22A rotates the X-axial threaded rod 23A, the pair of X-axis nut elements 24A move along the X-axial threaded rod 23A and allows the Y-axial threaded rod 23B and the guide rod 26 to move in the direction of X axis. When the Y-axis servomotor 22B rotates the Y-axial threaded rod 23B, the Y-axis net element 24B moves along the Y-axial threaded rod 23B and allows the primary coil 11 to move in the direction of the Y axis. At this time, the guide portion 27 connected to the primary coil 11 moves along the guide rod 26 and allows the primary coil 11 to move in the direction of the Y axis in a horizontal posture. Therefore, the primary coil 11 can be moved in the directions of the X axis and the Y axis by controlling the rotation of the X-axis servomotor 22A and Y-axis servomotor 22B by means of the position detection controller 14. It should be noted that, in the battery charger cradle of the present invention, the movement mechanism is not limited to the above-described mechanism. This is because every kind of mechanism is available as the movement mechanism that is moveable in the directions of the X axis and the Y axis.

Further, in the battery charger cradle of the present invention, the movement mechanism is not limited to the mechanism that moves the primary coil in the directions of the X axis and the Y axis. This is because the battery charger cradle of the present invention can have a linear guide wall provided on the top plate so as to be structured to place the battery built-in device along the guide wall, allowing the primary coil to move linearly along the guide wall. Although not illustrated, the battery charger cradle may have a movement mechanism that allows the primary coil to move in a single direction, for example, in the direction of the X axis alone, thus moving the primary coil linearly along the guide wall.

The position detection controller 14 detects the position of the battery built-in device 50 placed on the top plate 21. The position detection controller 14 shown in FIG. 1 through. FIG. 4 detects the position of the induction coil 51 contained in the battery built-in device 50 and brings the primary coil 11 closer to the induction coil 51. Further, the position detection controller 14 includes a first position detection controller 14A for roughly detecting the position of the induction coil 51 and a second position detection controller 14B for precisely detecting the position of the induction coil 51. The position detection controller 14 roughly detects the position of the induction coil 51 by means of the first position detection controller 14A and controls the movement mechanism 13 to make the position of the primary coil 11 closer to the induction coil 51; and subsequently, the position detection controller 14 precisely detects the position of the induction coil 51 and controls the movement mechanism 13 to make the position of the primary coil 11 precisely close to the induction coil 51. The battery charger cradle 10 quickly and more precisely allows the primary coil 11 to be brought closer to the induction coil 51.

As shown in FIG. 5, the first position detection controller 14A includes a plurality of position detection coils 30 fixed to the inner surface of the top plate 21, a pulsed power source 31 for supplying a pulse signal to the position detection coils 30, a receiver circuit 32 for receiving the echo signal outputted to the position detection coil 30 from the induction coil 51 which is excited by the pulse signal supplied from the pulsed power source 31 to the position detection coil 30, and a discrimination decision circuit 33 for judging the position of the primary coil 11 on the basis of the echo signal received by the receiver circuit 32.

The position detection coil 30 is composed of multiple rows and columns of coils, with the multiplicity of position detection coils 30 being fixed at prescribed intervals to the inner surface of the top plate 21. The position detection coil 30 includes a plurality of X-axis detection coils 30A for detecting an X-axis position of the induction coil 51, and a plurality of Y-axis detection coils 30B for detecting a Y-axis position of the induction coil 51. Each of the X-axis detection coils 30A is of a loop elongated in the direction of the Y axis, the plurality of X-axis detection coils 30A being fixed at prescribed intervals to an inner surface of the top plate 21. A distance (d) between the adjacent X-axis detection coils 30A is set to be smaller than an outer diameter (D) of the induction coil 51, with the distance (d) between the X-axis detection coils 30A being set to be preferably 1 to ¼ times the outer diameter (D) of the induction coil 51. When the distance (d) is made smaller, the X-axis detection coil(s) 30A can precisely detect the X-axis position of the induction coil 51. Each of the Y-axis detection coils 30B is of a loop elongated in the direction of the X-axis, with the multiplicity of Y-axis detection coils 30B being fixed at prescribed intervals to the inner surface of the top plate 21. Like in the case of the X-axis detection coil 30A, a distance (d) between the adjacent Y-axis detection coils 30B is also set to be smaller than an outer diameter (D) of the induction coil 51, with the distance (d) between the Y-axis detection coils 30B being set to be preferably 1 to ¼ times the outer diameter (D) of the induction coil 51. When the distance (d) is made smaller, the Y-axis detection coil(s) 30B can also precisely detect the Y-axis position of the induction coil 51.

Figure 7:
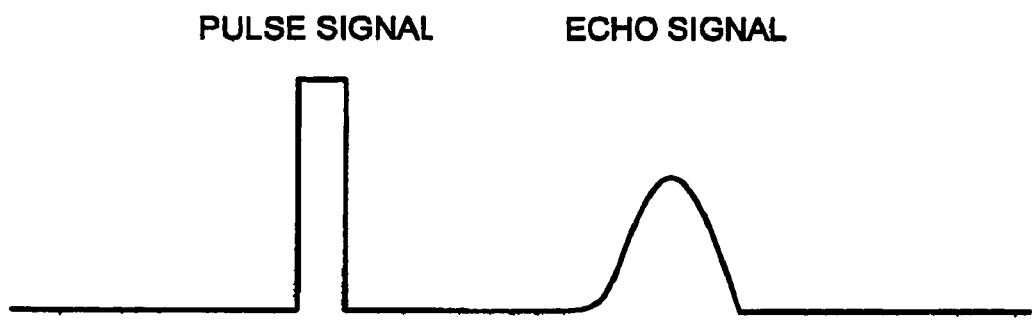
FIG. 7 is a graph showing an exemplary echo signal outputted from the induction coil being excited by the pulse signal.

The pulsed power source 31 outputs a pulse signal to the position detection coil 30 at a prescribed timing. The position detection coil 30 to which the pulse signal is inputted excites the approaching induction coil 51 by the pulse signal. The excited induction coil 51 outputs the echo signal to the position detection coil 30 by the energy of a flowing current. Therefore, in the position detection coil 30 located near the induction coil 51, as shown in FIG. 7, after the pulse signal has been inputted, the echo signal from the induction coil 51 is induced with a prescribed delay time. The echo signal induced to the position detection coil 30 is outputted to the discrimination decision circuit 33 by means of the receiver circuit 32. Therefore, the discrimination decision circuit 33, on the basis of the echo signal inputted from the receiver circuit 32, judges whether the induction coil 51 is brought closer to the position detection coil 30. When the echo signal is induced to the multiplicity of the position detection coils 30, the discrimination decision circuit 33 judges that the induction coil 51 is brought closest to the position detection coil 30 having the largest level of echo signal.

In the position detection controller 14 shown in FIG. 5, each of the position detection coils 30 is connected to the receiver circuit 32 via a switching circuit 34. In the position detection controller 14, since the connection is established with the plurality of position detection coils 30 by switching an input one after another, the echo signal from the plurality of position detection coils 30 can be detected by using one single receiver circuit 32. However, the echo signal can also be detected by connecting the receiver circuit to each of the position detection coils.

In the position detection controller 14 shown in FIG. 5, the connection to the receiver circuit 32 is established by sequentially switching the multiplicity of position detection coils 30 at the switching circuit 34 controlled by the discrimination decision circuit 33. The pulsed power source 31 is connected to the output side of the switching circuit 34 and outputs the pulse signal to the position detection coil 30. The level of pulse signal outputted from the pulsed power source 31 to the position detection coil 30 is very large when compared with the echo signal from the induction coil 51. The receiver circuit 32 is connected at the input side to a limiting circuit 35 composed of a diode. The limiting circuit 35 limits the signal level of the pulse signal inputted from the pulsed power source 31 to the receiver circuit 32 to be inputted to the receiver circuit 32. An echo signal with its smaller signal level is inputted to the receiver circuit 32 without being limited. The receiver circuit 32 amplifies and outputs both of the pulse signal and the echo signal. The echo signal outputted from the receiver circuit 32 is a signal being delayed after the pulse signal at a prescribed timing, for example, by several μsec to several hundred μsec. Since a delay time of the echo signal after the pulse signal is a constant one, a signal reaching at a prescribed delay time after the pulse signal is treated as an echo signal, and the level of the echo signal serves for judging whether the induction coil 51 is brought closer to the position detection coil 30.

The receiver circuit 32 is an amplifier for amplifying and outputting the echo signal inputted from the position detection coil 30. The receiver circuit 32 outputs the pulse signal and the echo signal. The discrimination decision circuit 33 judges whether the approach of the induction coil 51 to the position of the detection coil 30 is set on the basis of the pulse signal and the echo signal which are inputted from the receiver circuit 32. The discrimination decision circuit 33 is provided with an A/D converter for converting the signal, inputted from the receiver circuit 32, to a digital signal. The digital signal outputted from the A/D converter 36 is calculated to detect the echo signal. The discrimination decision circuit 33 detects the signal inputted at a delay time after the pulse signal as the echo signal, and also judges from the level of the echo signal whether the induction coil 51 is brought closer to the position detection coil 30.

The discrimination decision circuit 33 detects the X-axis position of the induction coil 51 by controlling the switching circuit 34 so as to sequentially connect the multiplicity of X-axis detection coils 30A to the receiver circuit 32. Every time when each of the X-axis detection coils 30A is connected to the receiver circuit 32, the discrimination decision circuit 33 outputs the pulse signal to the X-axis detection coil 30A connected to the discrimination decision circuit 33 and judges whether the induction coil 51 is brought closer to the X-axis detection coil 30A, based on whether or not the echo signal is detected at a prescribed delay time after the pulse signal. The discrimination decision circuit 33 judges whether the induction coil 51 is brought closer to each of the X-axis detection coils 30A, by connecting all of the X-axis detection coils 30A to the receiver circuit 32. When the induction coil 51 is brought closer to any of the X-axis detection coils 30A, the echo signal is detected in a state that the X-axis detection coil 30A is connected to the receiver circuit 32. Therefore, the discrimination decision circuit 33 can detect the X-axis position of the induction coil 51 by means of the X-axis detection coil 30A which can detect the echo signal. In a state where the induction coil 51 is brought closer across a plurality of X-axis detection coils 30A, the echo signal is detected from the plurality of X-axis detection coils 30A. In such state, the discrimination decision circuit 33 judges that the induction coil 51 is brought closest to the X-axis detection coil 30A where the strongest echo signal, that is, the echo signal with a large level is detected. The discrimination decision circuit 33 detects the Y-axis position of the induction coil 51 by similarly controlling the Y-axis detection coil 30B.

The discrimination decision circuit 33 controls the movement mechanism 13 on the basis of the detected X-axis and Y-axis directions, and moves the primary coil 11 to a position closer to the induction coil 51. The discrimination decision circuit 33 controls the X-axis servomotor 22A of the movement mechanism 13 and moves the primary coil 11 to the X-axis position of the induction coil 51. Further, the discrimination decision circuit 33 controls the Y-axis servomotor 22B of the movement mechanism 13 and moves the primary coil 11 to the Y-axis position of the induction coil 51.

In the above-described manner, the first position detection controller 14A moves the primary coil 11 to a position close to the induction coil 51. In the battery charger cradle of the present invention, after the first position detection controller 14A has brought the primary coil 11 closer to the induction coil 51, the battery 52 can be charged by carrying the electric power from the primary coil 11 to the induction coil 51. In the battery charger cradle, however, after the position of the primary coil 11 is further controlled precisely to be brought closer to the induction coil 51, the battery 52 can be charged by carrying the electric power. The primary coil 11 is brought more precisely closer to the induction coil 51 by the second position detection controller 14B.

Figure 8:
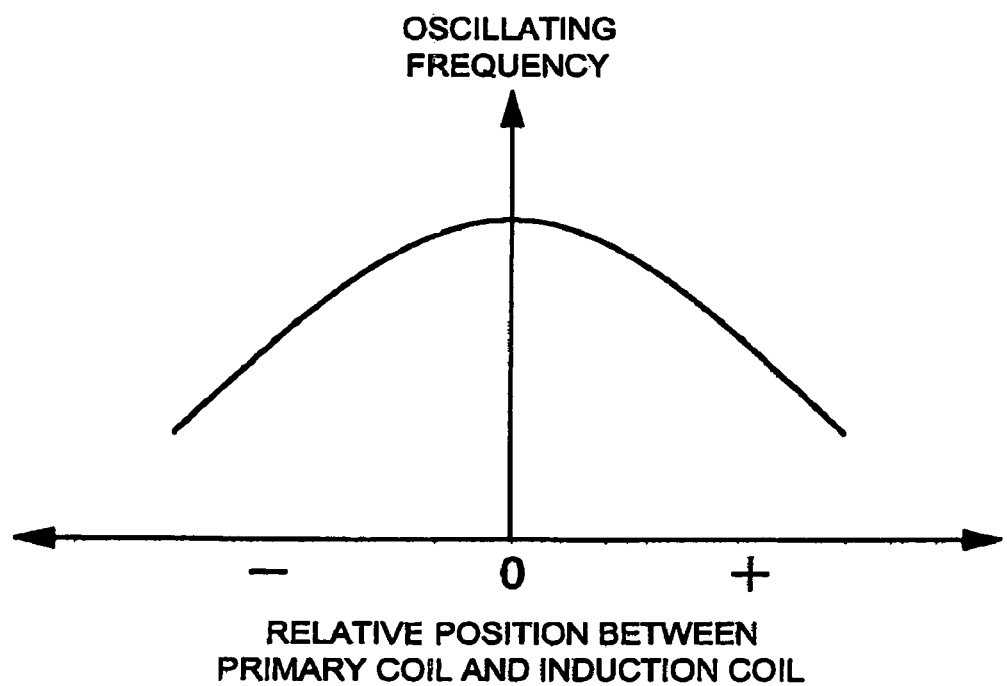
FIG. 8 is a graph showing a variation in the oscillating frequency with respect to the relative displacement between the primary coil and the induction coil.

The second position detection controller 14B, using the AC power source 12 as the self-excited oscillation circuit, precisely detects the position of the primary coil 11 on the basis of the self-excited oscillating frequency and controls the movement mechanism 13. The second position detection controller 14B controls the X-axis servomotor 22A and the Y-axis servomotor 22B of the movement mechanism 13, moves the primary coil 11 in the directions of the X-axis and the Y-axis, and detects the oscillating frequency of the AC power source 12. FIG. 8 shows the characteristics where the oscillating frequency of the self-excited oscillation circuit varies. This figure shows the variation in the oscillating frequency with respect to a relative displacement between the primary coil 11 and the induction coil 51. As shown in this figure, the oscillating frequency of the self-excited oscillation circuit becomes the highest at the position where the primary coil 11 is brought closest to the induction coil 51, and the oscillating frequency becomes lower in accordance with the relative displacement. Therefore, the second position detection controller 14B controls the X-axis servomotor 22A of the movement mechanism, moves the primary coil 11 in the direction of the X-axis, and stops the primary coil 11 at the position where the oscillating frequency becomes the highest. Likewise, the Y-axis servomotor 22B is controlled to move the primary coil 11 in the direction of the Y-axis, and the primary coil 11 is stopped at the position where the oscillating frequency becomes the highest. In the above-described manner, the second position detection controller 14B can move the primary coil 11 to the position closest to the induction coil 51.

In the above-described battery charger cradle, the first position detection controller 14A roughly detects the position of the induction coil 51, and subsequently the second position detection controller 14B performs a fine adjustment to bring the primary coil 11 even closer to the induction coil 51. In a position detection controller 64 as described below in conjunction with FIG. 9, the primary coil 11 can be brought closest to the induction coil 51 without performing such a fine adjustment.

Figure 9:
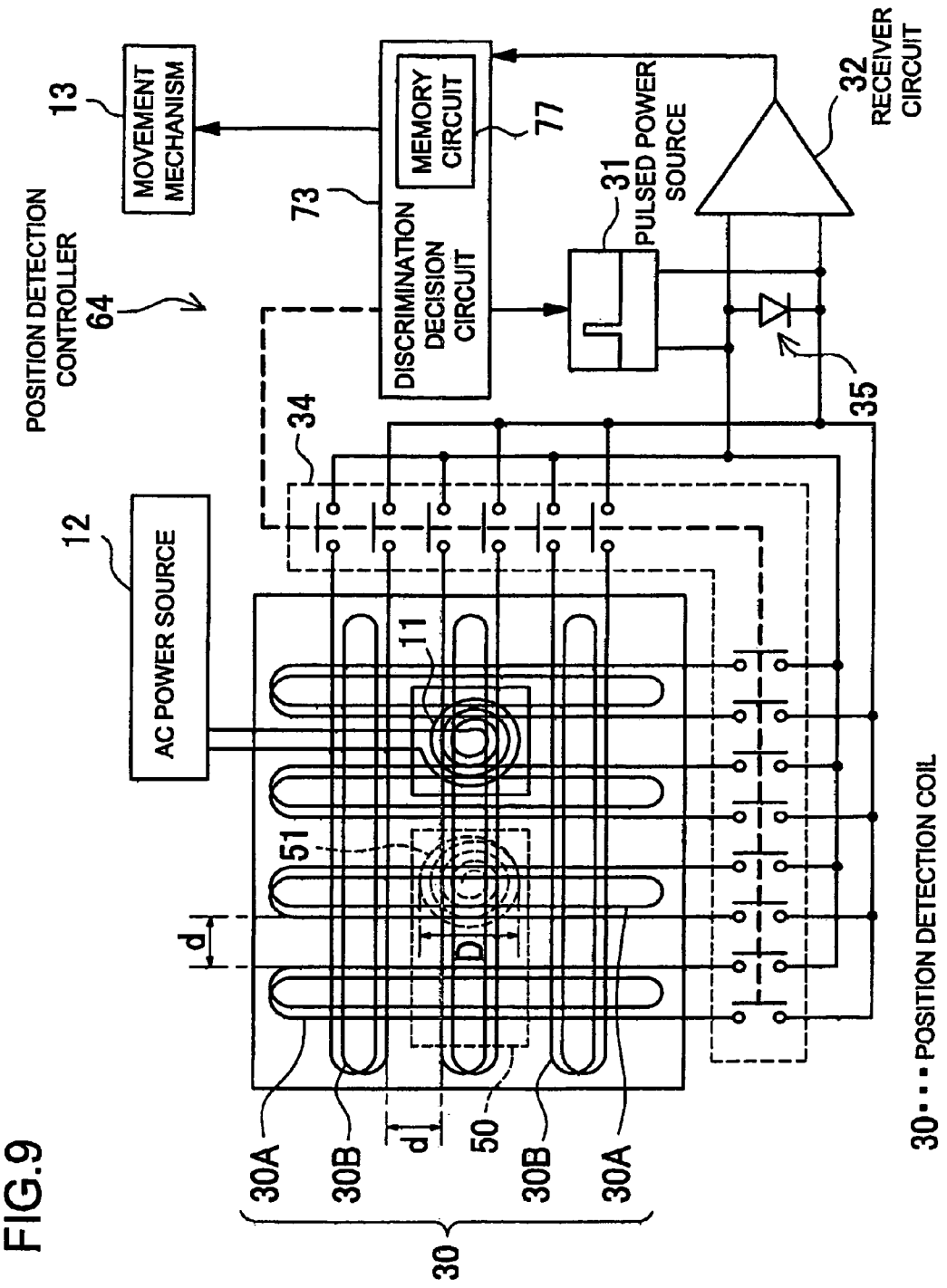
FIG. 9 is a circuit diagram showing the position detection circuit contained in the battery charger cradle in accordance with another embodiment of the present invention.

As shown in FIG. 9, the position detection controller 64 includes a plurality of position detection coils 30 fixed to the inner surface of the top plate, a pulsed power supply 31 for supplying a pulse signal to the position detection coil 30, a receiver circuit 32 for receiving the echo signal outputted to the position detection coil 30 from the induction coil 51 which is excited by the pulse signal supplied from the pulsed power source 31 to the position detection coil 30, and a discrimination decision circuit 73 for judging the position of the primary coil 11 on the basis of the echo signal received by the receiver circuit 32. Further, in the position detection controller 64, the discrimination decision circuit 73 is provided with a memory circuit 77 for storing a level of the echo signal induced to each of the position detection coils 30 with respect to the position of the induction coil 51, that is, as shown in FIG. 7, for storing a level of the echo signal induced after a prescribed lapse of time by exciting each of the position detecting coils 30 by the pulse signal. The position detection controller 64 detects the level of the echo signal induced to each of the position detection coils 30, and compares such level with the level of the echo signal stored in the memory circuit 77 to detect the position of the induction coil 51.

Figure 10:
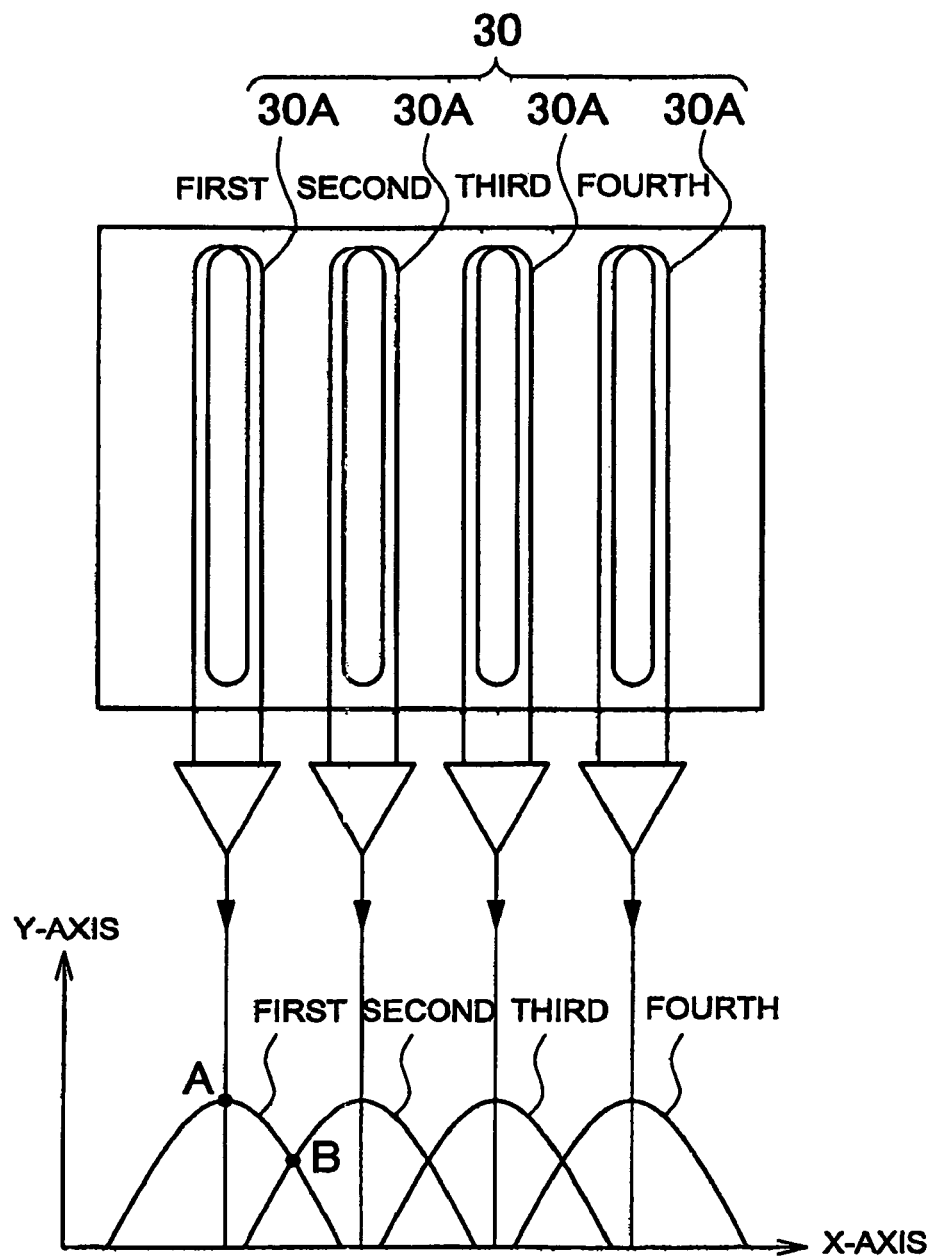
FIG. 10 is a graph showing the level of the echo signal induced to the position detection coil in the position detection controller shown in FIG. 9.

The position detection controller 64 works out the position of the induction coil 51 on the basis of the level of the echo signal induced to each of the position detection coils 30, in the following manner. The position detecting coil 30 shown in FIG. 9 includes a plurality of X-axis detection coils 30A for detecting the X-axis position of the induction coil 51 and a plurality of Y-axis detection coils 30B for detecting the Y-axis position of the induction coil 51, and the plurality of position detection coils 30 are fixed at prescribed intervals to the inner surface of the top plate 21. Each of the X-axis detection coils 30A is of a loop elongated in the direction of the Y axis, while each of the Y-axis detection coils 30B is of a loop elongated in the direction of the X axis. FIG. 10 shows the level of the echo signal induced to the X-axis position detection coil 30A in a state where the induction coil 51 is moved in the direction of the X axis, with a horizontal axis depicting the X-axis position of the induction coil 51 and a vertical axis depicting the level of the echo signal induced to each of the X-axis position detecting coil 30A. The position detection controller 64 can work out the X-axis position of the induction coil 51 by detecting the level of the echo signal induced to each of the X-axis position detection coils 30A. As shown in the figure, when the induction coil 51 is moved in the direction of the X axis, the level of echo signal induced to each of the X-axis position detection coils 30A is varied. For example, when the center portion of the induction coil 51 is located at the center portion of the first X-axis position detection coil 30A, the level of the echo signal induced to the first X-axis position detection coil 30A becomes the strongest, as indicated by spot A in FIG. 10. Further, when the induction coil 51 is intermediate between the first X-axis position detection coil 30A and the second X-axis position detection coil 30A, the echo signals induced to the first X-axis position detection coil 30A and the second X-axis position detection coil 30A are of the same level. That is to say, in each of the X-axis position detection coils 30A, the level of the echo signal induced when the induction coil 51 is located the closest becomes the strongest, and the level of the echo signal becomes smaller as the induction coil 51 moves away. Therefore, on finding which one of the X-axis position detection coils 30A exhibits the highest level of echo signal, it can be judged that the induction coil 51 is the closest to either one of the X-axis position detection coils 30A. Further, in the case where the echo signal is induced to the two X-axis position detection coils 30A, on finding that the echo signal is induced to the X-axis position detection coil 30A located in either one of the directions from the X-axis position detection coil 30A detecting the strong echo signal, it can be judged that the induction coil 51 is displaced in either one of the directions from the X-axis position detection coil 30A exhibiting the strongest echo signal, and also the relative position between the two X-axis position detection coils 30A can be judged from the level ratio of the echo signals. For example, when the level ratio of the echo signals is 1 between the two X-axis position detection coils 30A, the induction coil 51 can be judged to be positioned in the center of the two X-axis position detection coils 30A.

The discrimination decision circuit 73 stores, in the memory circuit 77, the level of echo signal induced to each of the X-axis position detection coils 30A with respect to the X-axis position of the induction coil 51. When the induction coil 51 is placed, the echo signal is induced to either one of the X-axis position detection coils 30A. Therefore, the discrimination decision circuit 73 detects the placement of the induction coil 51 on the basis of the echo signal induced to the X-axis position detection coil 30A, that is, the placement of the battery built-in device 50 on the battery charger cradle 10. Further, when the level of the echo signal induced to either one of the X-axis position detection coils 30A is compared with the level stored in the memory circuit 77, the X-axis position of the induction coil 51 can be judged. The discrimination decision circuit stores, in the memory circuit, a function specifying the X-axis position of the induction coil learned from the level ratio of the echo signals induced to the adjacent X-axis position detection coils, and the position of the induction coil can also be judged from the function. The function is worked out by detecting the level ratio of the echo signals induced to the respective X-axis position detection coils. The discrimination decision circuit 73 detects the level ratio of the echo signals induced to the two X-axis position detection coils 30A, and based on the detected level ratio, the X-axis position of the induction coil 51 between the two X-axis position detection coils 30A can be calculated and detected using the function.

The above description shows the method in which the discrimination decision circuit 73 detects the X-axis position of the induction coil 51 on the basis of the echo signal induced to the X-axis position detection coil 30A, while the Y-axis position of the induction coil 51 can also be detected on the basis of the echo signal induced to the Y-axis position detection coil 30B, like in the case of the X-axis position.

When the discrimination decision circuit 73 detects the X-axis and Y-axis positions of the induction coil 51, the position signal from the discrimination decision circuit 73 allows the position detection controller 64 to move the primary coil 11 to the position of the induction coil 51.

It should be noted that, when a waveform echo as described above is detected, the discrimination decision circuit 73 in the battery charger cradle can recognize and discriminate that the induction coil 51 is mounted to the battery built-in device 50. When a waveform other than the waveform of the echo signal is detected and discriminated, the discrimination decision circuit 73 judges that a matter (for example, a foreign metal) other than the induction coil 51 is mounted to the battery built-in device 50, and can cut the power supply. Further, when the waveform of the echo signal is not detected and discriminated, the electric power is not supplied because the induction coil 51 is not mounted to the battery built-in device 50.

In a state where the position detection controller 14, 64 controls the movement mechanism 13 to bring the primary coil 11 closer to the induction coil 51, the battery charger cradle 10 allows the AC power source 12 to supply the AC power to the primary coil 11. The AC power at the primary coil 11 is (electrically) carried to the induction coil 51 and is used for charging the battery 52. When a full charge state of the battery 52 is detected, the charging operation is stopped at the battery built-in device 50 and a signal of a full charge state is transmitted to the battery charger cradle 10. The battery built-in device 50 outputs the signal of a full charge state to the induction coil 51, transmits the signal of a full charge state from the induction coil 51 to the primary coil 11, and can transmit information of the full charge state to the battery charger cradle 10. The battery built-in device 50 outputs to the induction coil 51 an AC signal of a frequency different from the frequency of the AC power source 12, and the battery charger cradle 10 receives the AC signal at the primary coil 11 and can detect the full charge state. Further, it is also practicable that the battery built-in device 50 outputs a carrier wave of a specific frequency to the induction coil 51 in a signal modulated by the signal of the full charge state, the battery charger cradle 10 receives the carrier wave of the specific frequency, and the signal is demodulated to detect the signal of the full charge state. The battery built-in device can also radio-transmit the signal of the full charge state to the battery charger cradle to transmit the information on the full charge state. The battery built-in device incorporates a transmitter for transmitting the signal of the full charge state, and the battery charger cradle incorporates a receiver for receiving the signal of the full charge state. The position detection controller 14 shown in FIG. 6 incorporates a full charge state detection circuit 17 for detecting the full charge state of the built-in battery 52. The full charge state detection circuit 17 detects the signal of the full charge state outputted from the battery built-in device 50 and detects the full charge state of the battery 52.

The battery charger cradle 10 allowing a plurality of battery built-in devices 50 to be placed on the top plate sequentially switches and fully charges the batteries 52 contained in the plurality of battery built-in devices. The battery charger cradle 10 initially detects the position of the induction coil 51 of any one of the battery built-in devices 50, brings the primary coil 11 closer to that induction coil 51, and fully charges the battery 52 contained in that battery built-in device 50. When the battery 52 contained in the battery built-in device 50 is fully charged and the full charge state detector circuit 17 receives the signal of the full charge state, the position detection controller 14 detects the position of the induction coil 51 contained in a second battery built-in device 50 which is placed at a different position of the previously-mentioned battery built-in device 50, controls the movement mechanism 13 and brings the primary coil 11 closer to the induction coil 51 contained in the second battery built-in device 50. In this state, the electric power is carried to the battery 52 contained in the second battery built-in device 50 to fully charge the battery 52. Further, when the battery 52 contained in the second battery built-in device 50 is fully charged and the full charge state detection circuit 17 receives a signal of the full charge state from the second battery built-in device 50, the position detection controller 14 further detects the induction coil 51 contained in a third battery built-in device 50, controls the movement mechanism 13, brings the primary coil 11 closer to the induction coil 51 contained in the third battery built-in device 50, and fully charges the battery 52 contained in the third battery built-in device 50. In the above-described manner, when a plurality of battery built-in devices 50 are placed on the top plate 21, the battery built-in devices 50 are switched from one after another to fully charge the built-in batteries 52. The battery charger cradle 10 stores the position of the battery built-in device having been fully charged, and does not charge the battery 52 contained in the battery built-in device 50 having been fully charged. When it is detected that the batteries 52 contained in all the battery built-in devices placed on the top plate 21 have been fully charged, the battery charger cradle 10 stops the operation of the AC power source 12 and stops charging the battery 52. Here, in the above-described embodiment, the charging operation is to be stopped when the battery 52 contained in the battery built-in device 50 has been fully charged, but when the battery 52 reaches a prescribed capacity, the charging operation may also be stopped, with the prescribed capacity being regarded as a full charge state.

The second position detection controller 14B shown in FIG. 6 judges the relative position between the primary coil 11 and the induction coil 51 in accordance with a variation in the oscillating frequency of the self-excited oscillation circuit, but the second position detection controller performing a fine adjustment of the relative position between the primary coil and the induction coil can detect the relative position of the primary coil with respect to the induction coil on the basis of either the power consumption of the AC power source supplying the voltage and the electric power to the primary coil or the electric current induced to the induction coil. The second position detection controller may be a separately excited oscillation circuit because the oscillating frequency does not have to be varied.

Figure 11:
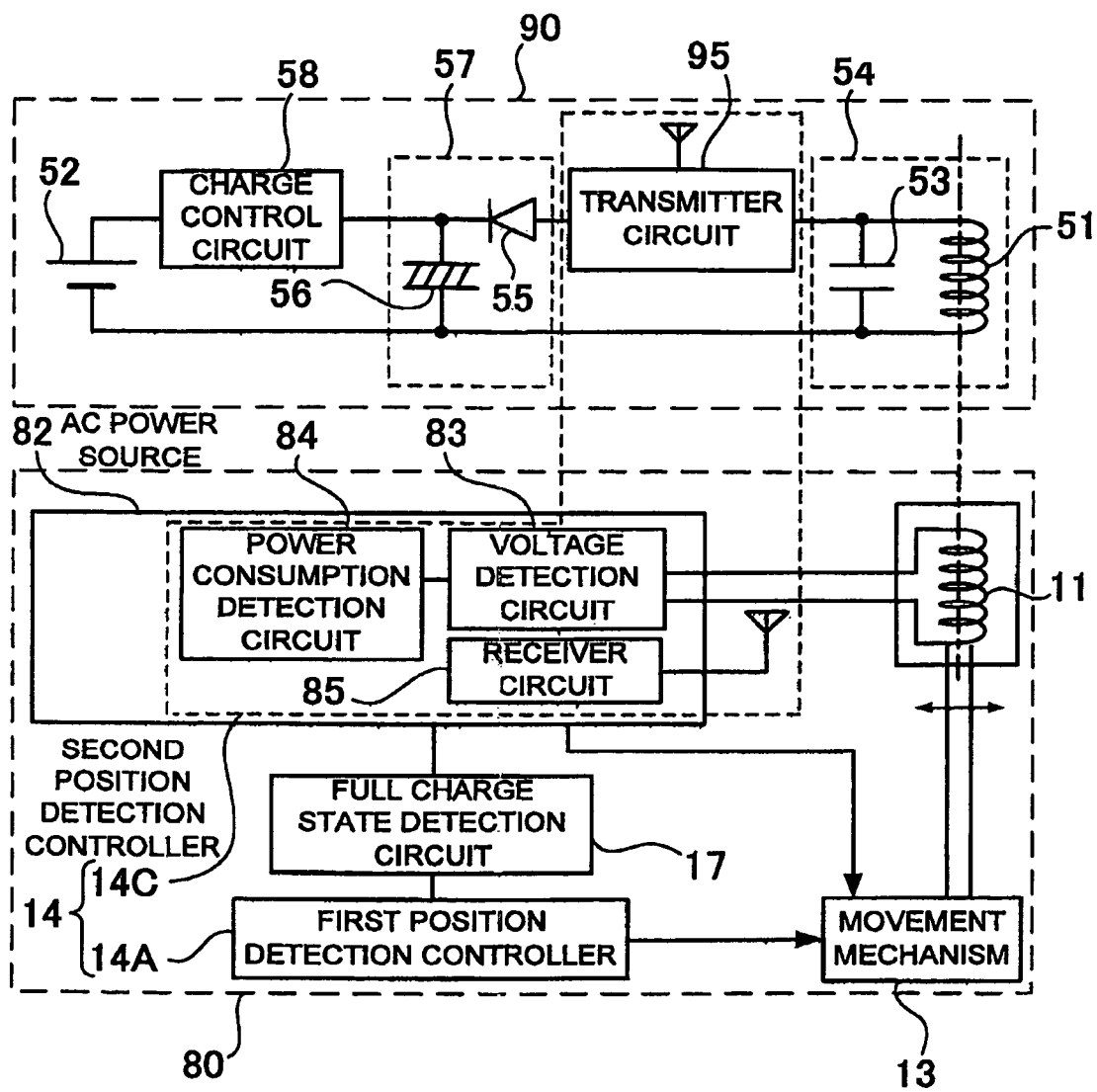
FIG. 11 is a circuit diagram showing the position detection controller contained in the battery charger cradle in accordance with an alternative embodiment of the present invention.
Figure 12:
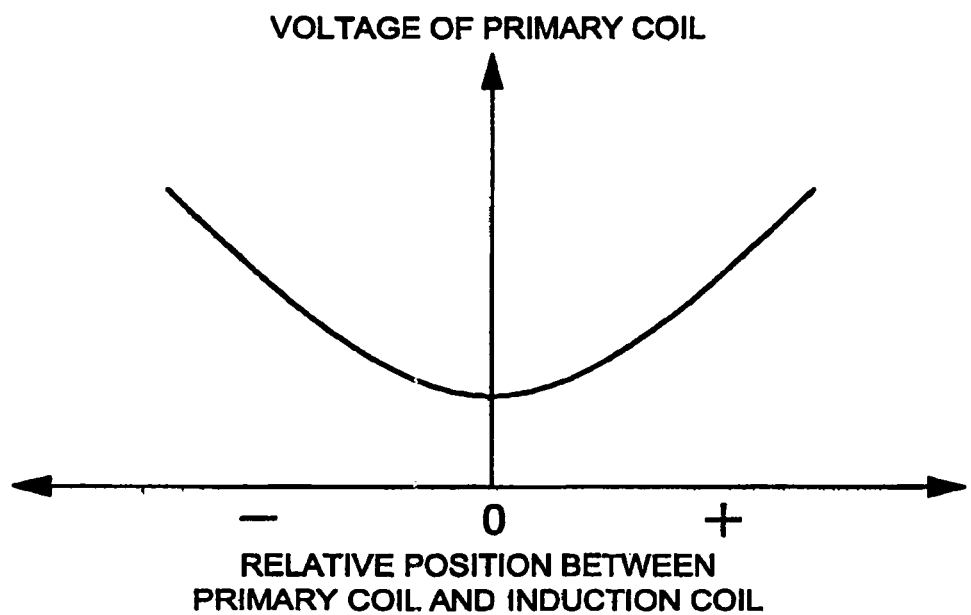
FIG. 12 is a graph showing the variation in the voltage at the primary coil with respect to the relative displacement between the primary coil and the induction coil.

With reference to FIG. 11, the second position detection controller 14C for detecting a relative position of the primary coil 11 with respect to the induction coil 51 on the basis of the voltage at the primary coil 11 rectifies the AC voltage generated at the primary coil 11 to convert to a direct voltage, and incorporates a voltage detection circuit 83 for detecting such voltage. The second position detection controller 14C moves the primary coil 11 and detects the voltage at the primary coil 11 by means of the voltage detection circuit 83. FIG. 12 shows the characteristics in which the voltage at the primary coil 11 varies with respect to a relative position between the primary coil 11 and the induction coil 51. The figure shows the variation in the voltage at the primary coil 11 with respect to the relative displacement between the primary coil 11 and the induction coil 51. As shown in this figure, the voltage at the primary coil 11 becomes the lowest at a position where the primary coil 11 is brought closest to the induction coil 51, and the voltage becomes higher as the relative position is displaced. Therefore, the second position detection controller 14C controls an X-axis servomotor 22A of the movement mechanism 13, moves the primary coil 11 in the direction of the X axis, and stops the primary coil 11 at a position where the voltage becomes the lowest. Further, the Y-axis servomotor 22B is likewise controlled to move the primary coil 11 in the direction of the Y axis, and stops the primary coil 11 at a position where the voltage at the primary coil 11 becomes the lowest. In the above-described manner, the second position detection controller 14C can move the primary coil 11 to a position closest to the induction coil 51.

Figure 13:
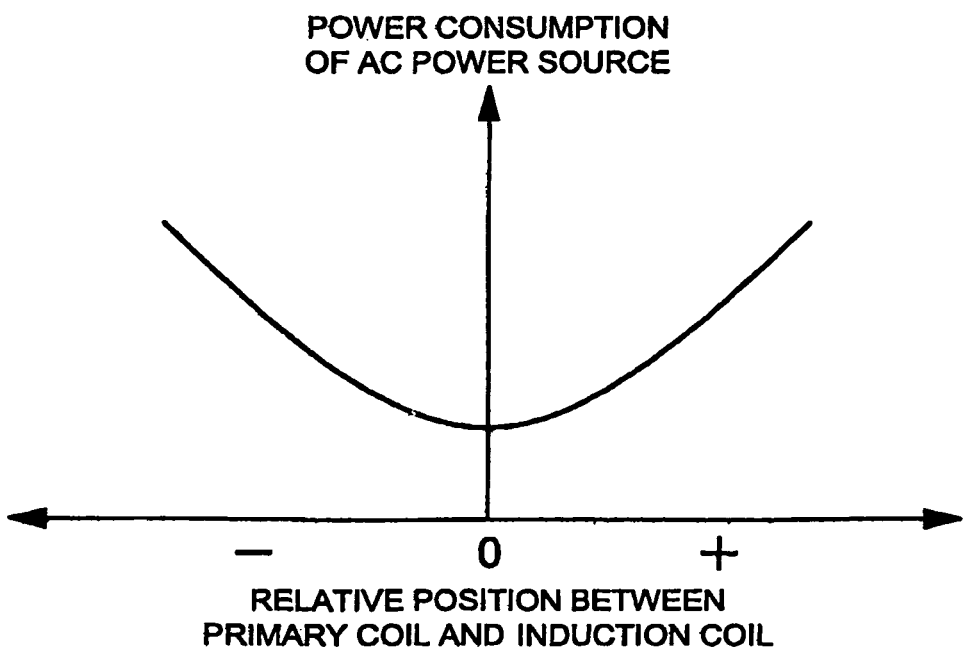
FIG. 13 is a graph showing the variation in the power consumption at the AC power source supplying the electric power to the primary coil with respect to the relative displacement between the primary, coil and the induction coil.
Figure 14:
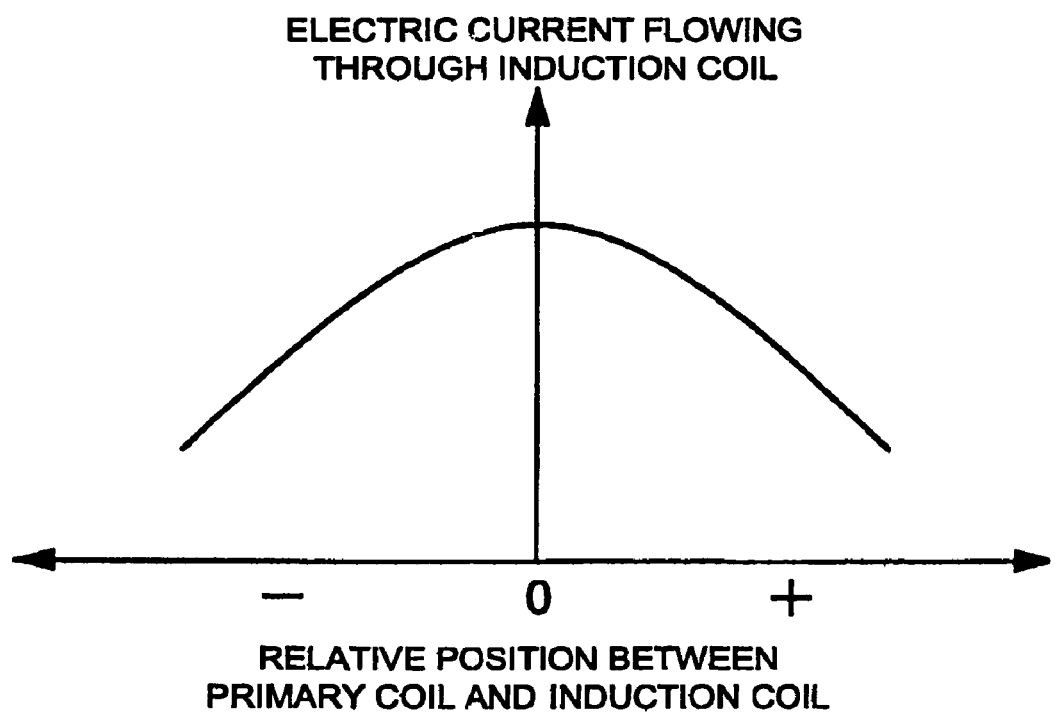
FIG. 14 is a graph showing the variation in the electric current flowing through the induction coil with respect to the relative displacement between the primary coil and the induction coil.

With reference again to FIG. 11, the second position detection controller 14C detecting the relative position of the primary coil 11 with respect to the induction coil 51 on the basis of the power consumption at the AC power source 82 supplying the electric power to the primary coil 11 incorporates a power consumption detection circuit 84 detecting the power consumption at the AC power source 82. The second position detection controller 14C moves the primary coil 11 and detects the power consumption at the AC power source 82 by means of the power consumption detection circuit 84. FIG. 13 shows the characteristics in which the power consumption at the AC power source 82 varies with respect to the relative position between the primary coil 11 and the induction coil 51. The figure shows the variation in the power consumption at the AC power source 82 with respect to a relative displacement between the primary coil 11 and the induction coil 51. As can be seen in the figure, the power consumption at the AC power source becomes the smallest at a position where the primary coil 11 is brought closest to the induction coil 51, and the power consumption becomes larger as the relative position is displaced. Therefore, the second position detection controller 14C controls the X-axis servomotor 22A of the movement mechanism 13, moves the primary coil 11 in the direction of the X axis, and stops the primary coil 11 at a position where the power consumption at the AC power source 82 becomes the smallest. Further, Y-axis servomotor 22B is likewise controlled to move the primary coil 11 in the direction of the Y axis, and stops the primary coil 11 at a position where the power consumption at the AC power source 82 becomes the smallest. In the above-described manner, the second position detection controller 14C can move the primary coil 11 to a position closest to the induction coil 51.

With reference again to FIG. 11, the second position detection controller 14C detecting the relative position of the primary coil 11 with respect to the induction coil 51 on the basis of the current flowing through the induction coil 51 incorporates a circuit for detecting the electric current flowing through the induction coil 51. The second position detection controller 14 includes a transmitter circuit 95 for detecting, on the side of the battery built-in device 90, the current flowing through the induction coil 51 and for radio-transmitting a carrier wave modulated by such detected current, and a receiver circuit 85 for receiving, on the side of the battery charger cradle 80, the signal transmitted from the transmitter circuit 95, and demodulating the signal to detect the current flowing through the induction coil 51. The second position detection controller 14C moves the primary coil 11 and detects the current flowing through the induction coil 51. FIG. 13 shows the characteristics in which the current flowing through the induction coil 51 varies with respect to the relative position between the primary coil 11 and induction coil 51. The figure shows the variation of the induction coil 51 with respect to a relative displacement between the primary coil 11 and the induction coil 51. As shown in the figure, the current flowing through the induction coil 51 becomes the largest at a position where the primary coil 11 is brought closest to the induction coil 51, and the electric current becomes smaller in accordance with displacement of the relative position. Therefore, the second position detection controller 14C controls the X-axis servomotor 22A of the movement mechanism 13, moves the primary coil 11 in the direction of the X axis, and stops the primary coil 11 at a position where the current flowing through the induction coil 51 becomes the largest. The Y-axis servomotor 22B is likewise controlled to move the primary coil 11 in the direction of the Y axis, and stops the primary coil 11 at a position where the electric current flowing through the induction coil becomes the largest. In the above-described manner, the second position detection controller 14C can move the primary coil 11 to a position closest to the induction coil 51.

Although the above-described movement mechanism 13 moves the primary coil 11 in the directions of the X axis and the Y axis to bring the primary coil 11 to a position closest to the induction coil 51, the present invention is not limited to a structure where the movement mechanism moves the primary coil in the directions of the X axis and the Y axis to bring the position of the primary coil to be the closest to the induction coil, but the primary coil can also be moved in a variety of directions to be brought closer to the induction coil.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Applications No. 2007-325,662 filed in Japan on Dec. 18, 2007, No. 2008-64,860 filed in Japan on Mar. 13, 2008, and No. 2008-293,933 filed in Japan on Nov. 17, 2008, the contents of which are incorporated herein by references.

What is claimed is:

1. A battery charger cradle designed to be used with a battery built-in device having an electromagnetically coupled induction coil incorporated in the battery built-in device and a battery rechargeable with a power induced by the induction coil, the battery charger cradle comprising:
    a primary coil connected to an AC power source for inducing electromotive force to the induction coil;
    a casing containing the primary coil and having a top plate, wherein the primary coil is enclosed within the casing and the battery built-in device is to be placed on a top surface of the top plate;
    a movement mechanism for moving the primary coil along an inner surface of the top plate, the inner surface being opposite relative to the top surface of the top plate, wherein the movement mechanism is enclosed within the casing; and
    a position detection controller for detecting a position of the battery built-in device placed on the top plate and controlling the movement mechanism to bring the primary coil closer to the induction coil contained in the battery built-in device, the position detection controller comprising a plurality of stationary position detection coils fixed inside the top plate of the casing,
    wherein, when the battery built-in device is placed on the top surface of the top plate of the casing, the position detection controller detects the position of the battery built-in device with the plurality of stationary position detection coils, the position detection controller controls the movement mechanism so that the movement mechanism moves the primary coil along the inner surface of the top plate to bring the primary coil closer to the induction coil contained in the battery built-in device.

2. A battery charger cradle designed to be used with a battery built-in device having an electromagnetically coupled induction coil incorporated in the battery built-in device and a battery rechargeable with a power induced by the induction coil, the battery charger cradle comprising:
    a primary coil connected to an AC power source for inducing electromotive force to the induction coil;

a casing containing the primary coil and having a top plate on the top of which the battery built-in device is to be placed;

a movement mechanism, contained in the casing, for moving the primary coil along an inner surface of the top plate; and a position detection controller for detecting a position of the battery built-in device placed on the top plate and controlling the movement mechanism to bring the primary coil closer to the induction coil contained in the battery built-in device, wherein, when the battery built-in device is placed on the top plate of the casing, the position detection controller detects the position of the battery built-in device, the position detection controller controls the movement mechanism, and the movement mechanism moves the primary coil along the top plate to bring the primary coil closer to the induction coil contained in the battery built-in device, wherein the top plate of the casing is so sized as to allow a plurality of battery built-in devices to be placed thereon; the position detection controller incorporates a full charge state detection circuit for detecting a full charge state of a built-in battery; when the full charge state detection circuit detects the full charge state of the battery contained in the battery built-in device being subjected to a charging operation, a position of a non-charged battery built-in device incorporating a battery which is not fully charged is detected; and the movement mechanism is controlled to bring the primary coil closer to the induction coil contained in the non-charged battery built-in device to charge the battery contained in the non-charged battery built-in device.

3. The battery charger cradle as recited in claim 1, wherein the position detection controller detects the position of the induction coil and brings the primary coil closer to the induction coil.

4. The battery charger cradle as recited in claim 1, wherein the position detection controller moves the primary coil along the top plate in the directions of at least either the X axis or the Y axis to be brought closer to the induction coil.

5. The battery charger cradle as recited in claim 1, wherein the position detection controller further comprises a pulsed power source for supplying a pulse signal to the position detection coil, a receiver circuit for receiving an echo signal outputted to the position detection coil from the induction coil which is excited by the pulse signal supplied from the pulsed power source to the position detection coil, and a discrimination decision circuit for judging a position of the induction coil on the basis of the echo signal received by the receiver circuit.

6. The battery charger cradle as recited in claim 5, wherein the position detection coil comprises a plurality of X-axis detection coils 30A for detecting an X-axis position of the induction coil, and a plurality of Y-axis detection coils for detecting a Y-axis position of the induction coil.

7. The battery charger cradle as recited in claim 6, wherein the X-axis detection coils are of a loop elongated in the direction of Y axis, the plurality of X-axis detection coils being fixed at prescribed intervals to an inner surface of the top plate.

8. The battery charger cradle as recited in claim 7, wherein a distance between the adjacent X-axis detection coils is set to be smaller than an outer diameter of the induction coil.

9. The battery charger cradle as recited in claim 6, wherein the plurality of the Y-axis detection coils are of a loop elongated in the direction of X-axis, the plurality of Y-axis detection coils being fixed at prescribed intervals to the inner surface of the top plate.

10. The battery charger cradle as recited in claim 9, wherein a distance between the adjacent Y-axis detection coils is set to be smaller than an outer diameter of the induction coil.

11. The battery charger cradle as recited in claim 5, wherein the position detection controller comprises a switching circuit switching each of the position detection coils to connect with the receiver circuit, wherein an input into the receiver circuit is switched one after another to be connected with the plurality of position detection coils.

12. The battery charger cradle as recited in claim 5, wherein the position detection controller comprises a switching circuit switching and connecting an output side of the pulsed power source to the position detection coil, wherein the pulsed power source is switched to the plurality of position detection coils to output the pulse signal.

13. The battery charger cradle as recited in claim 1, wherein the AC power source has a self-excited oscillation circuit, and the position detection controller detects the position of the induction coil on the basis of an oscillating frequency of the self-excited oscillation circuit to control the movement mechanism.

14. The battery charger cradle as recited in claim 1, wherein the position detection controller comprises a first position detection controller for roughly detecting a position of the induction coil contained in the battery built-in device and a second position detection controller for precisely detecting the position of the induction coil, wherein the primary coil having been brought closer to the induction coil by the first position detection controller is then brought even closer to the induction coil by the second position detection controller.

15. The battery charger cradle as recited in claim 14, wherein the first position detection controller comprises a plurality of position detection coils fixed to the top plate, a pulsed power source for supplying a pulse signal to the position detection coil, a receiver circuit for receiving an echo signal outputted to a position detection coil from an induction coil which is excited by the pulse signal supplied from the pulsed power source to the position detection coil, and a discrimination decision circuit for judging a position of the induction coil on the basis of the echo signal received by the receiver circuit.

16. The battery charger cradle as recited in claim 14, wherein the AC power source has a self-excited oscillation circuit, and the second position detection controller detects a position of the induction coil on the basis of an oscillating frequency of the self-excited oscillation circuit and controls the movement mechanism.

17. The battery charger cradle as recited in claim 1, wherein the position detection controller comprises a plurality of position detection coils fixed to an inner surface of a top plate, a pulsed power supply for supplying a pulse signal to the position detection coil, a receiver circuit for receiving an echo signal outputted to the position detection coil from the induction coil which is excited by the pulse signal supplied from the pulsed power source to the position detection coil, and a discrimination decision circuit for judging a position of the induction coil on the basis of the echo signal received by the receiver circuit; and further the discrimination decision circuit comprises a memory circuit for storing a level of the echo signal induced to each of the position detection coils with respect to the position of the induction coil, wherein the level of the echo signal induced to each of the position detection coils is compared with a level of the echo signal stored in the memory circuit to detect a position of the induction coil.

18. The battery charger cradle as recited in claim 14, wherein the second position detection controller moves the primary coil and stops the primary coil at a position where a voltage of the primary coil becomes the lowest.

19. The battery charger cradle as recited in claim 14, wherein the second position detection controller moves the primary coil and stops the primary coil at a position where power consumption of an AC power source becomes the smallest.

20. The battery charger cradle as recited in claim 14, wherein the second position detection controller moves the primary coil and stops the primary coil at a position where an electric current flowing through the induction coil becomes the largest.

21. The battery charger cradle as recited in claim 1, wherein the battery built-in device has a capacitor being parallel-connected to the induction coil, a parallel resonance circuit is constituted by the capacitor and the induction coil, and a resonance frequency of the capacitor and the induction coil is a frequency similar to a frequency electrically carried from the primary coil.

22. The battery charger cradle as recited in claim 1, wherein the plurality of position detection coils are disposed over at least an area corresponding to a region that the primary coil reaches within the top plate of the casing, and wherein the primary coil is configured to be fixed in a direction of the Z axis, which is perpendicular to the top plate, when the position detection controller detects the position of the battery built-in device.

* * * * *